May 17, 1955   B. M. OLIVER   2,708,750
PULSE-ACTUATED CIRCUITS
Filed May 12, 1944   5 Sheets-Sheet 3

INVENTOR
B. M. OLIVER
BY
Hugh S. Wertz
ATTORNEY

FIG. 6

United States Patent Office 2,708,750
Patented May 17, 1955

2,708,750

PULSE-ACTUATED CIRCUITS

Bernard M. Oliver, New York, N. Y., assignor to Bell Telephone Laboratories, Incorporated, New York, N. Y., a corporation of New York Application May 12, 1944, Serial No. 535,274

26 Claims. (Cl. 343—7.3)

This invention relates to pulse or signal-actuated devices and more specifically to radiant energy distance measuring systems of the pulse reflection type. In one of its more important specific aspects the invention relates to automatic range tracking radar systems.

Radio object locating and distance measuring systems (frequently called "radar" systems) are known in which pulse modulated waves of ultra-high frequency (called "transmitted pulses" or "emitted pulses") are emitted at intervals, reflections thereof are received from objects upon which the emitted waves impinge, and the reflection delay times for particular reflections are determined to provide indications of the distances of the objects from which the respective reflected pulses are received. In a radar system of the automatic tracking type, such as, for example, that disclosed in an application of B. M. Oliver, Serial No. 547,573, filed August 1, 1944, and which issued as Patent 2,478,778 on August 9, 1949, the range of the target is indicated continuously on one or more dials of the unit called the "range unit" the function of which is to produce a pulse at a variable period of time after the corresponding transmitted pulse, the time delay between the range unit pulse and transmitted pulse being a measure of the distance to the selected object. Each range unit output pulse, in the arrangement disclosed in the above-identified Oliver application, is utilized to generate two similar time-spaced gating waves, each gating wave being used to unblock one of two tubes to both of which is also applied the video or "echo" signals from the receiver. If each "echo" pulse from the selected target (the one being tracked) is not symmetrically positioned in time with respect to the two gating waves, a differential current is produced which is utilized to drive a motor to act upon the range unit in such a way that the time displacement between the gating waves and the received echo pulses is reduced. The motor controlling the timing of the range unit pulse operates until the differential current is zero, at which condition the selected echo pulse is symmetrically positioned each cycle with respect to the two gating waves.

It is an object of this invention to provide an improved distance indicating or measuring system of the pulse reflection type.

It is another object of this invention to provide improved means for determining the distance to a selected target or other reflecting object or point continuously.

It is another object of this invention to provide a novel system controlled by incoming pulses of electromagnetic energy.

It is still another object of this invention to provide an improved automatic tracking arrangement for an object-locating and distance measuring system.

A further object is to provide improved means for maintaining a predetermined time or phase relationship between corresponding pulses in two series of pulses having substantially similar rates of repetition.

In accordance with one aspect of the present invention, a novel arrangement for maintaining such a time or phase relationship between two such series of pulses is provided. In a specific embodiment of the invention, an automatic range tracking radar system, chosen by way of example for purposes of illustration, utilizes the feature of "cathode-gating." Moreover, instead of shifting the time of occurrence of two closely-adjacent gating pulses with respect to a selected echo pulse, as in the automatic tracking arrangement of the above-identified Oliver application, a single gating pulse is shifted with respect to two differently delayed images of the selected echo pulse until the gating pulse is symmetrically arranged in time relationship with respect to the two signal pulses. The difference in the two delays of the echo pulse is preferably made comparable to the duration of the gating pulse, and the shorter of the two delay times may be made zero. The two differently delayed images of the selected echo pulse are applied to the control elements of two tubes, to the cathodes of which is applied, each cycle, the negative gating pulse. The gating pulse drives the two cathodes sharply in a negative direction (hence the term "cathode-gating"), causing the two tubes to conduct and vary the charges on two condensers, connected one to each anode. The outputs of these two gated integrator tubes are differentially amplified so that if the gating pulse is unsymmetrically positioned with respect to the differently delayed images of the selected echo, a current is produced which is utilized to cause a motor to shift the position of the gating pulse until it is symmetrically positioned with respect to the two differently delayed images. The position of the phase shifter in the variable delay circuit (range unit) adjusted by the motor is then an indication of the range of the target.

An important advantage of the cathode gating aspect of the invention is that in the absence of the gating pulse, the anodes of the tubes, to the control elements of which are applied the delayed images of the selected echo pulse, are held at potentials below their corresponding cathodes and hence thermionic leakage current is eliminated.

Another image of the selected echo pulse, one which is delayed by a time interval which is one-half the sum of the two intervals by which the echo pulses used for range tracking are delayed (and which thus occurs at a time which is centrally located with respect to the other two delayed images), is utilized to produce an "on-target" indication. This is accomplished in the specific arrangement disclosed herein by applying the average of the output voltages of the first two-mentioned integrator tubes to the control grid of a tube which forms one of a pair of two tubes connected as a differential amplifier, the second of these latter two tubes having applied to its control grid the output of a third integrator tube to the cathode of which is applied the gating pulse and to the control grid of which is applied the delayed image of the echo pulse utilized to give the "on-target" indication. The average of the output voltages of the first two integrator tubes is obtained, in an illustrative arrangement, from the cathodes of two tubes forming a differential amplifier for the range error signal, each of the grids of these two tubes being connected to the anode of one of the first-mentioned cathode-gated integrator tubes. The average of the cathode potentials of this pair of differential amplifier tubes will be more positive than the desired average output potential of the integrators by an amount which is the operating grid bias of the differential amplifier tubes, but this constant bias can be subtracted from the average cathode potential by means of the circuit which delivers this average potential to the "on-target" differential amplifier. The output of this latter, the "on-target" differential amplifier, may be used to operate a relay to give a visual or audible indication of whether the device is tracking or not and also to shift a relay (called the scan-track relay) in a scanning circuit from a "tracking" to a "scanning" position or vice versa. In the present arrangement, when no signal is being received, equal amounts of noise will integrate into the three tubes to the cathodes of which the gating signal is applied and hence there is no constant output voltage in the differential amplifier due to this noise. However, if the device is properly "following" an echo pulse, the integrated charge due to this echo pulse will be less (assuming the applied echo pulses are of negative polarity) in the cathode-gated tube utilized for "on-target" indication than in the average of the two cathode-gated tubes utilized to produce automatic range tracking because only the first or last portion of a delayed echo pulse image is applied to the control grids of the latter two tubes during the gating interval. Thus, by comparing the output of the tube utilized for "on-target" indication with the average of the output of the two tubes used for automatic tracking, information as to the tracking condition (that is, whether the arrangement is tracking or not) is obtained.

When the arrangement is not "tracking," that is, when it is not following a target, it is desirable to be able to scan the field of range or, in other words, to drive the motor operating the phase shifter (variable condenser) in the variable delay unit (range unit) at a fixed speed so that the position of the output pulse of this unit with respect to the transmitted pulse is varied continuously at a fixed rate.

It is another object of this present invention to provide improved means for causing a rapid scanning of available range settings to be made.

It is a further object of this invention to provide a distance measuring arrangement wherein, when the arrangement is not automatically tracking a desired target, the dials on the variable delay or range unit are driven from a minium value to a maximum value (preferably these limits are adjustable and lie within the actual range limits of the range unit) and are then reversed so that the readings on the dials reciprocate between these limiting scan values.

In a specific illustrative embodiment of the invention, there is provided a scanning circuit controlled by the relay operated by the "on-target" indication circuit which performs the following functions: (1) it causes the device to scan in the absence of an echo pulse; (2) it reverses the direction of scan when a maximum or minimum scanning limit is reached; (3) it cancels the scan when the device is tracking or following the target; (4) it permits manual drive to be applied in spite of an "on-target" indication; and (5) it causes the device to continue to scan in the direction the range unit dial was moving during the previous tracking period or period of manual drive until a target is "picked up" or the limit stop is reached. The scanning voltages are produced by creating an unbalance in the input voltage of the modulator driving the motor connected to the variable condenser in the range unit. When the scan-track relay is operated from the track to the scan position (for example, if a fade occurs) the scanning or unbalance voltage is applied to the modulator in such a direction as to drive the motor in the same direction that it was going when it was tracking. If an echo pulse is picked up again, the scan-track relay is operated to the track position and the scanning ceases but if for some reason, such as fading, the echo pulse is not picked up, that is, a pulse is not found in such a position that it locks in with the automatic tracking equipment, the unbalance or scan voltage is applied to drive the motor at a fixed speed until a scanning limit switch is reached, causing the motor to reverse and start scanning in the opposite direction. When the opposite limit switch is reached, the scanning voltage is again reversed. Thus the range motor during scanning is driven between a maximum and a minimum scanning range and then caused to retrace its path in the opposite direction, the scanning being continued until a target is "picked up." When the scan-track relay is in the tracking position, connections from the scanning circuit to the modulator are broken so that the scanning circuit is ineffective during tracking. If during tracking, the target "disappears" into the interval below the minimum range that it can be tracked, the operation of the minimum limit switch on the variable condenser shaft in the variable delay unit will have had no effect in so far as reversing the motor drive is concerned (since it was passed while tracking) and the indication on the dials is held at "minimum" range even though the pulse disappears into the interval below this minimum range. Even though the device is tracking, the motor may still be slewed off target by grounding, by means of a manual drive key, one or the other of the terminals to the modulator. When this is done, a scanning voltage is established in the same direction (causing the device to "coast" in the indicated slew direction as soon as the on-target indication ceases or, in other words, as soon as the relay is shifted to the scan position) or the slew has been removed, whichever is later.

In radar and other pulse actuated systems, it is desirable to vary the gain of a signal amplifier so that the selected pulse is held at substantially constant amplitude. It is also desirable to limit the time of operation of this receiver to a certain fraction of the pulsing cycle, for reasons which will be given below.

It is thus another object of this invention to provide improved means for controlling the gain of an amplifier, and particularly an amplifier in the receiver of signals comprising pulses, in accordance with the strength of a received pulse signal.

It is a further object of this invention to provide novel means for cutting off or greatly reducing the output of an amplifier in the receiver of a pulse-actuated system of the object-locator type by controlling the amplifier so that signals are received only during the few microseconds after the transmitted pulse during which the echo pulses are in the operating range.

In the specific embodiment of the invention chosen for illustration, automatic gain control to hold the echo amplitude constant is provided. This permits the use of more gain when the echo is weak without having as a result a high noise level and overload during periods when the echo is strong. A pulse series produced in the automatic tracking circuit is rectified and applied, through an appropriate filter and equalizer circuit, as a bias on one grid of a tube to the same grid of which is applied a relatively long pulse having a duration longer than the outer range limit of the apparatus and starting preferably immediately after the completion of the transmitted pulse. Thus, an output pulse of positive polarity having the duration of the "long" input pulse and a height determined by the voltage rectified by the (AGC) rectifier and hence by the amplitude at the integrator tubes of the echo being tracked, is applied to the grids of the tubes comprising the intermediate frequency amplifier in the receiver, these grids being otherwise biased to cut-off. In other words, the receiver is so gated that a signal is received only during the few microseconds after each transmitted pulse during which echoes are in range. This removes the high intensity transmitted pulse from the receiver and also makes "jamming" more difficult. At the same time usable power is saved not only in the intermediate frequency amplifier itself, but also because the duty cycle on high current tubes is shortened since there is no noise most of the time.

Other objects, some of them more or less ancillary to those already mentioned, and other features of the invention, will be apparent from the following description.

The invention will be more readily understood by referring to the following description taken in connection with the accompanying drawings forming a part thereof in which.

Figure 1:
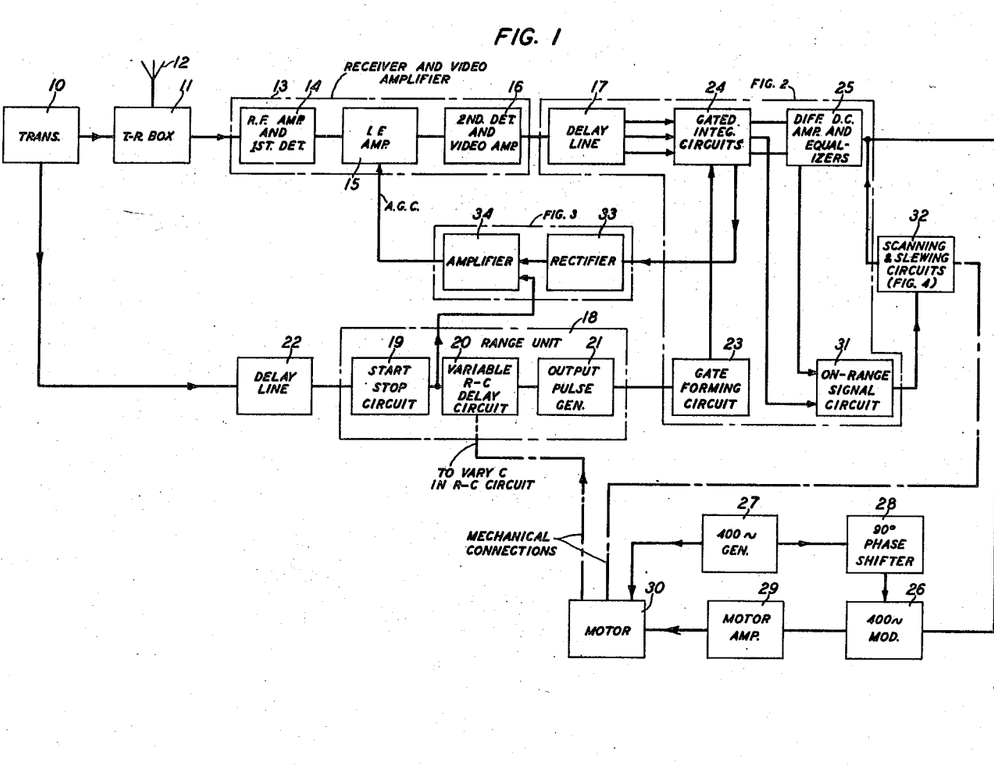
Fig. 1 is a schematic block diagram of a radar system in accordance with the invention.

Referring more particularly to the drawings, Fig. 1 shows, by way of example for illustrative purposes, an automatic tracking radar circuit in accordance with the invention. Fig. 1 is a single line block diagram which shows the relationship of the various major elements of the system and it is not intended to be a circuit diagram. In this arrangement, an ultra-high frequency pulse-modulated wave is produced in the transmitter 10. The transmitter may comprise, for example, a high voltage rectifier of any suitable form which supplies about 12,000 volts, for example, direct current to a charging circuit or element. After the charging voltage goes up to about 21,000 volts, any suitable rotary spark gap discharges the capacitor in the charging circuit. This discharge takes place in about one microsecond and causes the magnetron oscillator in the transmitter to oscillate for this brief period and send short pulses of radio frequency energy through T-R box 11 to an antenna 12 which, for example, can be of the polystyrene "polyrod" type. A suitable antenna is disclosed in an application of G. E. Mueller, Serial No. 469,284, filed December 17, 1942, and which issued as Patent 2,425,336 on August 12, 1947. By way of example, substantially 400 transmitted pulses per second are radiated. Radiations from the antenna strike one or more objects and produce reflections or echoes therefrom which are received by the antenna 12 and transmitted through the T-R box 11 to the receiver and video amplifier 13. The T-R box can be of any desirable type, for example, that employing a Western Electric Company 709-A tube in a resonant cavity. This tube is filled with an ionizable gas and has a small gap therein. During reception of the low voltages of the received energy, the gas is not ionized, the cavity is tuned to resonance and the received energy is applied to the receiver and video amplifier 13. During the emission of a transmitted pulse from the transmitter 10, the voltage due to the pulse ionizes the gas thus detuning the cavity and substantially preventing the energy of the pulse from reaching the receiver and video amplifier 13.

In the receiver and video amplifier 13, the received waves are amplified and heterodyned to a convenient intermediate frequency by suitable circuit elements 14. These intermediate frequency waves are amplified by an I. F. amplifier 15 subject to automatic gain control, and then applied to an element 16 comprising a second detector and video amplifier of any convenient form. The output of the video amplifier is applied to a delay line 17 of any convenient form, the purpose of which will be described more fully below.

Figure 5:
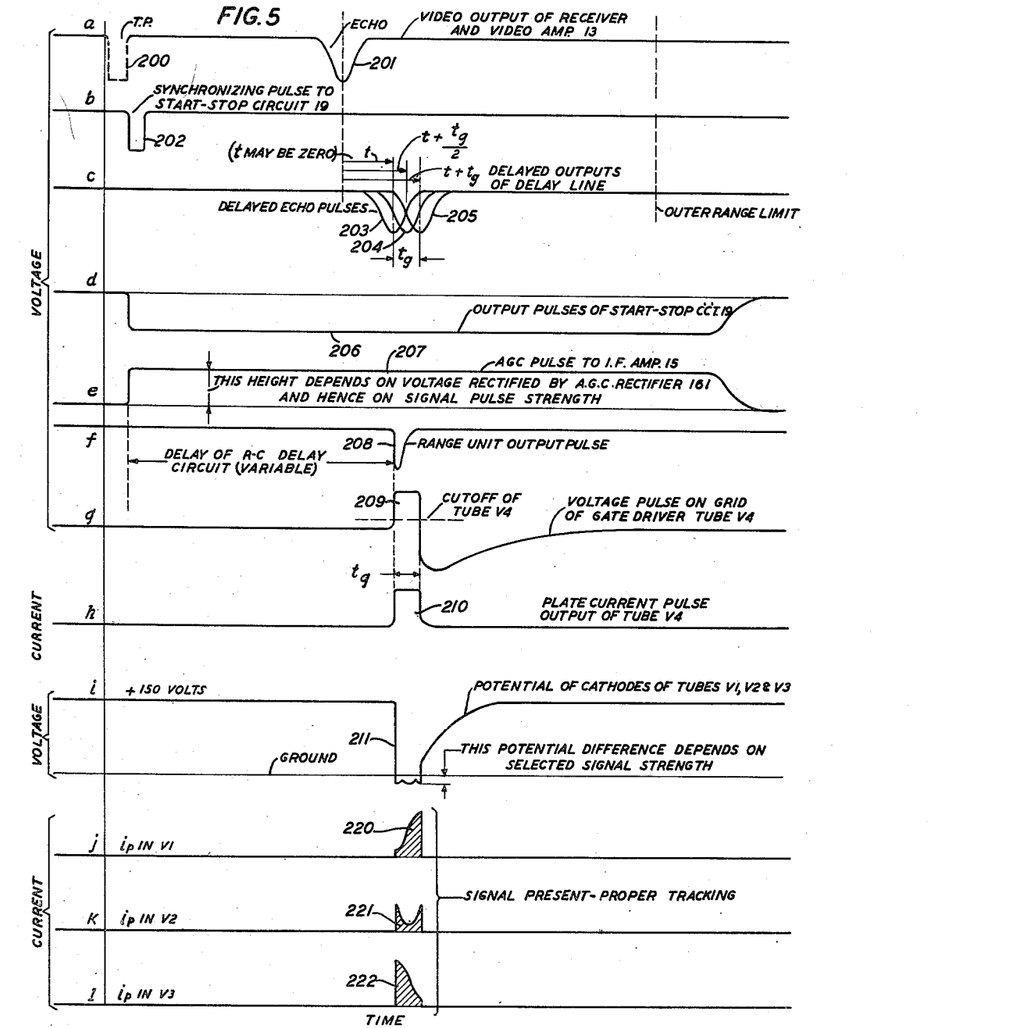
Figs. 5 and 6 are diagrammatical and graphical representations to aid in understanding the invention.

Pulse energy from the transmitter 10, in the nature of synchronizing pulses, controls the variable delay unit 18 (called the "range unit") which comprises a start-stop circuit 19, a variable R-C delay circuit 20, and an output pulse generator 21. The purpose of the unit 18 is to produce a pulse of predetermined length at a controllable period of time after the initiation of the pulse 202 (see Fig. 5). The pulse 202 is delayed with respect to the pulse 200 (which is a video pulse corresponding in time to an emitted pulse from the transmitter 10) by a delay line 22 of any suitable type. A suitable range unit is disclosed in an application of B. M. Oliver, Serial No. 515,904, filed December 28, 1943, and which issued as Patent 2,435,598 on February 10, 1948. The circuit shown in the Oliver application Serial No. 515,904, like that shown in Fig. 1, comprises a monovibrator start-stop circuit, a variable R-C delay circuit, and an output pulse generator. The input pulse (like the pulse 202) is impressed upon the start-stop circuit which produces a wave (like the wave 206 shown in Fig. 5, line d) having a negative step coincident with the starting pulse 202 and which terminates prior to the time of occurrence of the next succeeding starting pulse, the period between the beginning and ending of the pulse 206 being designated the "active" period, and the interval between successive active periods being designated the "quiescent" period. The start-stop wave (206) is impressed upon the R-C delay circuit to cause current to flow through a path including a condenser to cause the charge on the condenser to decrease during the period which commences with the occurrence of each starting pulse (202) and to subsequently increase during each active period. The interval between the time when a starting pulse (202) occurs and the time when the charge on the condenser reaches its minimum value is determined by the time constant of the path including the condenser, which time constant may be variable. The output pulse generator produces a delayed output pulse of desired shape at the time when the charge on the condenser reaches its minimum value. This output pulse can be like the pulse 208 shown in line f of Fig. 5. The period of delay of the R-C delay circuit, as shown in Fig. 5, line f, is variable. This period is preferably varied by changing the capacity of the condenser. This variation in capacity is obtained, by way of example, by rotating one part of the condenser with respect to another part thereof.

The output pulse 208 produced by the generator 21 is applied to a gate-forming circuit 23 which may be, for example, like the gate-forming circuit shown in the above-mentioned patent of B. M. Oliver, No. 2,478,778. This circuit produces a wave such as that shown in Fig. 5, at line g. This wave is applied to the gate driver tube V4 which is biased to cut-off except during the positive part of wave 209, when the grid is driven to a slightly positive potential with respect to the cathode. This causes tube V4 to conduct a rectangular pulse 210 of plate current shown at line h, Fig. 5. The pulse 210 is applied to three gated integrator circuits represented by the box 24, in Fig. 1, and shown in greater detail in the circuit diagram of Fig. 2, to which are also applied three delayed images 203, 204 and 205 of an echo pulse 201. The pulse 203 is delayed by a time $t$ (which may be zero, or in other words, the pulse 203 may coincide with the echo 201 shown in Fig. 5, line a), the pulse 204 is delayed by a time $t+t_g/2$ while pulse 205 is delayed from the pulse 201 by an interval $t+t_g$, $t$ being any convenient amount depending on the delays in other parts of the circuit and $t_g$ corresponding to the width of the gating pulse 209. While the circuit 24 will be more fully described below in connection with Fig. 2 a brief description will be given at this point. The first and third of these tubes, gated by the current pulse 210, are utilized to produce automatic range tracking. Through these two tubes in parallel a total current is drawn during the gating interval, the division of which between these two tubes being unequal if the gate is not symmetrically placed with respect to the pulses 203 and 205. The currents are integrated over the gating period and the corresponding charges produce voltages on the condensers in the plate circuits which are applied to a differential direct coupled amplifier and equalizers 25, the output of which is applied to a modulator 26 to which is also applied, through a 90-degree phase shifter 28, 400-cycle waves from a source 27. The output of the modulator 26 which is a suppressed carrier amplitude-modulated wave is amplified in the amplifier 29 and applied to one of the two-phase windings of the motor 30 to the other one of which is applied a 400-cycle wave from the generator 27. The motor 30 is preferably of the two-phase low inertia type. Since the carrier input to the modulator 26 is shifted 90 degrees by the phase shifter 28, the output of the amplifier 29 will bear a ±90 degrees phase relation to the fixed phase excitation of the motor from the source 27, depending on the direction of the unbalance which drives the modulator 26. Any unbalance voltage resulting from the delayed echoes 203 and 205 not occurring symmetrically with respect to the gating wave 209 causes the rotation of the armature of the motor 30, which is mechanically connected (by any appropriate means indicated by a dot-dash line in Fig. 1) to the range unit 18 to drive the variable condenser in the variable R-C delay circuit 20 in the range unit. The rotation is in a direction to vary the time of the output pulse of the range unit in such a way that the delayed echo pulses 203 and 205 are centered about the gating pulse 209, reducing the unbalance of the driving voltage to zero. One or more dials (not shown) on the range unit, calibrated in hundreds or thousands of yards of range, for example, indicate the delay introduced by the range unit 18 and give an accurate indication of the range.

Figure 4:
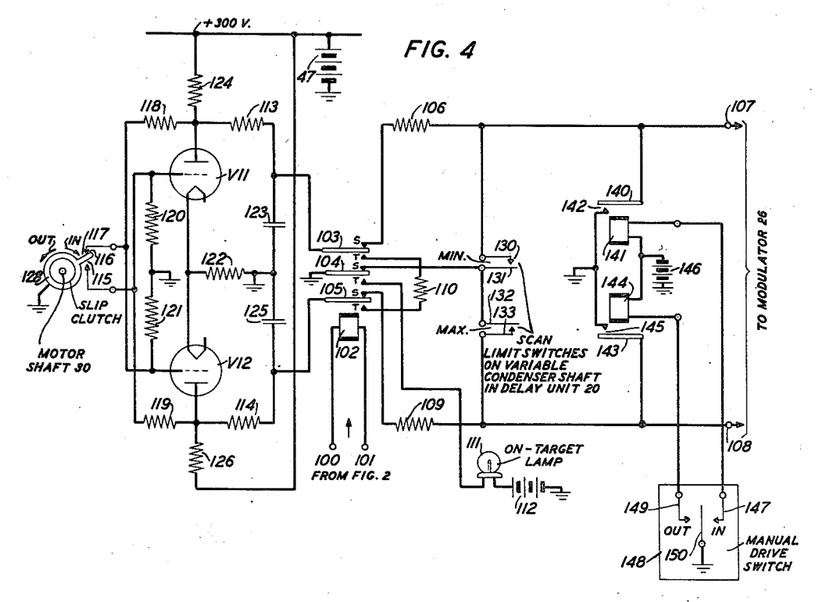
Fig. 4 is a circuit diagram of a portion of the arrangement shown in Fig. 1 utilized for scanning and slewing.

The pulse 204 which is symmetrically positioned with respect to the pulses 203 and 205, is applied to the control grid of the second of the three gated tubes mentioned above. The gating pulse is also applied to the cathode of this tube to drive it sharply negative during the gating interval as in the case of the two gated integrator tubes utilized for range tracking. When the circuit is range tracking with small error, the center of the gating pulse occurs at substantially the same time as the center of the pulse 204. Very little current then passes through the second of the gating tubes during the gating interval because its grid is held negative during the gate time by the pulse 204. Under these conditions, the gating pulse begins just as the pulse 203 reaches a maximum and ends just as the pulse 205 reaches a maximum. Only half of each of the pulses 203 and 205, respectively, is effective in decreasing the current passed by the first and third gated tubes and these tubes accordingly pass more current than the second of the gated tubes when tracking a pulse. Under tracking conditions, therefore, the output voltage $e_2$ of the second gated tube is greater than the average of the output voltages ($e_1$ and $e_3$) of the other two tubes. This information is used as an indication of the presence of the pulse 204 in or near the center of the gate pulse 209. The circuit 31 which will be described more fully below in connection with a description of Fig. 2 compares the output voltages $e_2$ and $$\frac{e_1+e_3}{2}$$

to produce an "on range" signal which may be utilized to give a visible or audible indication and/or to actuate the scan-track relay forming part of the scanning and slewing circuits 32. These scanning and slewing circuits have been briefly described above and will be described in greater detail in connection with the circuit shown in Fig. 4.

The potential to which the cathodes of the integrator tubes V1, V2 and V3 are driven in order to pass the current demanded by the driver tube V4 will depend on the average potential of their grids during the gate and is therefore a measure of the selected signal strength. This potential is rectified and utilized for automatically controlling the gain of the I. F. amplifier 15. The rectification is accomplished by rectifier 33 and applied to an amplifier 34 to which is also applied the output negative pulse 206 from the start-stop circuit 19. This produces an output positive pulse 207 (see Fig. 5, line c) of the same duration as the pulse 206 but the height of which depends on the voltage rectified by the rectifier 33 and hence on the strength of the echo pulse 204. The I. F. amplifier 15 may be biased to cut-off or biased so that only a very low current passes therethrough and the pulse 207 then causes these tubes to conduct during the period starting shortly after the occurrence of the transmitted pulse 200 and ending about 50 microseconds later, during which period of time all echoes within range will have been received.

Figure 2:
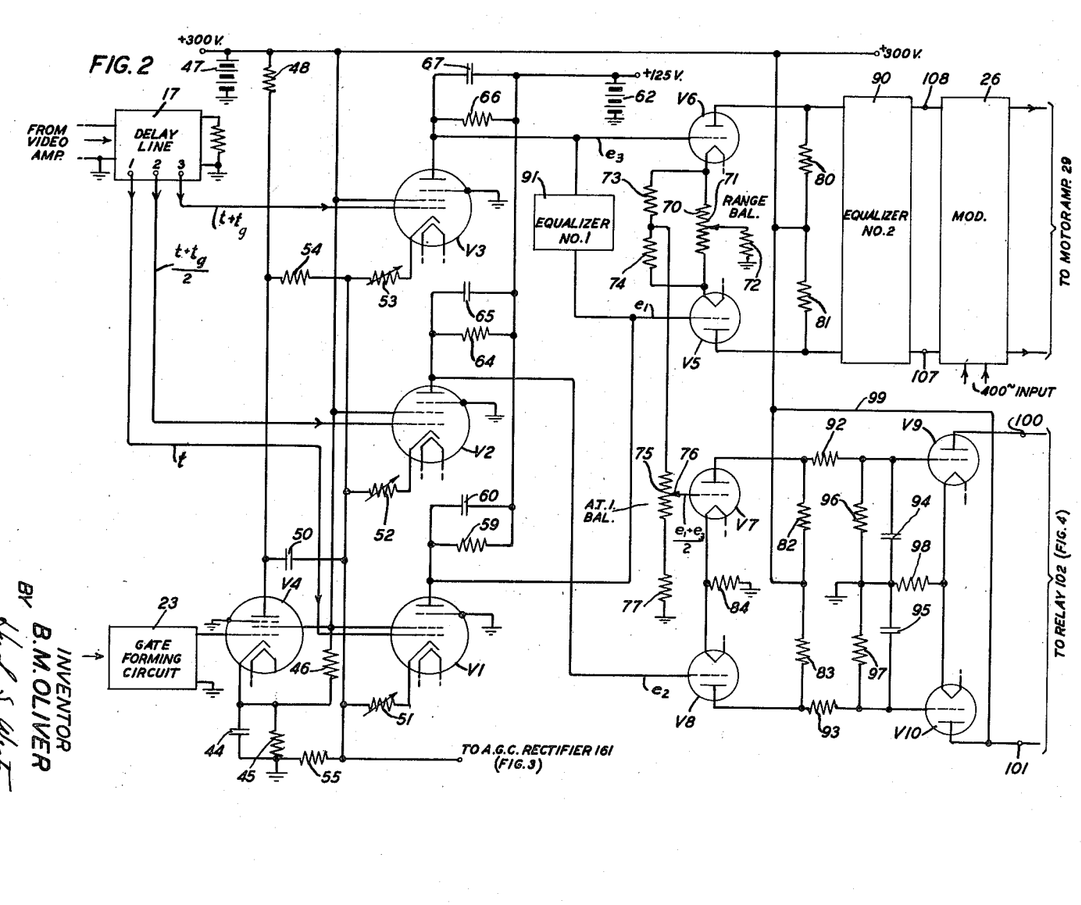
Fig. 2 is a circuit diagram of a portion of the range tracking unit of the system shown in Fig. 1.

Reference will now be made to Fig. 2 which shows circuit diagrams for the integrator circuit 24, the differential direct coupled amplifier and equalizers 25 and the on-range signal circuit 31, and the relationship of these circuits to other elements shown in the schematic diagram of Fig. 1. The output of the video amplifier 16 which includes an echo pulse 201 is applied to the delay line 17 to produce three delayed output pulses, pulse 203 delayed by a time $t$, pulse 204 delayed by a time $$t+\frac{t_g}{2}$$

and pulse 205 delayed by a time $t+t_g$. As pointed out above, $t$ may be anything from zero up to a few microseconds depending on other time delays in the system and $t_g$ is the time span of the gate pulse 209 shown in Fig. 5 at line $g$. The pulses 203, 204 and 205 are similar to each other and are preferably similar in form to the echo pulse 201 but this is not necessary. Pulse 203 is applied to the control grid of the tube V1, pulse 204 is applied to the control grid of the tube V2 and pulse 205 is applied to the control grid of the tube V3. The output pulse 209 from the gate-forming circuit 23 is applied to the control grid of tube V4, the cathode of which is connected through the parallel-connected capacity member 44 and resistor 45 to ground and through resistor 46 to the positive terminal of a source of potential of about 300 volts, this source being represented by way of example as a battery 47. The anode of the tube V4 is connected to the positive terminal of the source 47 through a resistor 48. The suppressor grid of the tube V4 is connected to ground while the screen grid thereof is connected to the positive pole of the source 47. The anode of the tube V4 is connected to the cathodes of the tubes V1, V2 and V3 through a coupling condenser 50 and balancing resistors 51, 52 and 53, respectively. These cathodes are normally biased to a positive potential by means of the voltage-dividing potentiometer comprising the resistors 48, 54 and 55, the common terminals of the resistors 54 and 55 being connected through the resistors 51, 52 and 53, respectively, to the respective cathodes of the tubes V1, V2 and V3. This places a potential on each of these cathodes, in the absence of a signal from the tube V4, of about 150 volts positive. The screen grids of the tubes V1, V2 and V3, respectively, are connected to the positive terminal of the source 47. The anode of the tube V1 is connected through the parallel-connected resistance member 59 and capacity member 60 to the positive terminal of a source 62. Similarly, the anode of the tube V2 is connected to the source 62 through the parallel-connected resistance member 64 and condenser 65, while the anode of the tube V3 is connected to the source 62 through the parallel-connected resistor 66 and condenser 67. Sources 47 and 62 are assumed to be appropriately filtered and by-passed.

The anode of the tube V1 is connected directly to the control element of the tube V5 while the anode of the tube V3 is connected directly to the control element of the tube V6. The tubes V5 and V6 constitute a differential direct coupled amplifier. The cathodes of the tubes V5 and V6 are connected by a resistor 70, an inner adjustable tap 71 of which is connected through a resistor 72 to ground. Also connected between the cathodes of the tubes V5 and V6 are equal resistors 73 and 74, the common terminal of which is connected through a portion of the resistor 75 and adjustable tap 76 to the control element of the tube V7. The resistor 75 is connected through a resistor 77 to ground. The anode of the tube V2 is connected directly to the control element of the tube V8 which forms with the tube V7 a second differential amplifier.

The anodes of the tubes V5 and V6 are connected through equal resistors 80 and 81, respectively, to the positive terminal of the source 47. Similarly, plate voltage for the tubes V7 and V8 is supplied by a connection from the plates of these tubes to the positive terminal of the source 47 through respective resistors 82 and 83.

The cathodes of the tubes V7 and V8 are connected through resistor 84 to ground. The output signal of the tubes V5 and V6 is applied through an equalizer 90 to the modulator 26. Another equalizer 91 is connected between the control elements of the tubes V5 and V6. The purpose of the equalizers 90 and 91 is to produce signal equalization and stabilization for the range tracking loop including the mechanical system. The design of these equalizers also is such as to raise the loop gain more rapidly to a high value in the very low frequency region where the signal spectrum is concentrated and at the same time drop the loop gain to a low value at high frequencies where there is little signal energy. The equalizers have a time constant such as to permit the system to track with little disturbance through short fades. Any suitable equalizing circuits for these purposes may be used.

The modulator 26 may comprise a bridge structure of four rectifier elements such as that shown in the above-identified patent of B. M. Oliver, No. 2,478,778. An alternating current from a suitable source such as the source of 400-cycle voltage 27 is applied through the 90-degree phase shifting network 28 to one diagonal of the bridge, the other diagonal being connected to the output of the equalizer 90. The modulator 26 operates in accordance with the description in Patent 2,025,158, issued December 24, 1935, to F. A. Cowan, to suppress the carrier from the source 27 and transmit to the output circuit of the modulator substantially only the upper and lower sidebands produced by the amplitude modulation of this carrier by the signal input. The output wave of the modulator is similar to that shown in Fig. 7B of the above-mentioned Oliver patent, No. 2,478,778. The output wave from the modulator 26 is amplified by the motor amplifier 29 which may be of the conventional push-pull type and then applied to one winding of the two-phase motor 30 as mentioned above.

The anodes of the differential amplifiers V7 and V8 are connected through resistors 92 and 93, respectively, to the control elements of the tubes V9 and V10, respectively. Equal condensers 94 and 95 are connected to ground from the control elements of the tubes V9 and V10. The resistor 96 shunts the condenser 94 and the similar resistor 97 shunts the condenser 95. The cathodes of the tubes V9 and V10 are connected together and their common terminal connected through the resistor 98 to ground. The anode of the tube V10 is connected to the positive terminal of the source 47 through a connection 99. The anode of the tube V9 is connected to terminal 100 of the relay 102 in the scanning and searching circuit of Fig. 4, the other terminal 101 of this relay being connected to the positive terminal of the source 47 through the connection 99.

Before describing the operation of the circuits shown in Fig. 2, the circuits shown in Fig. 3 and Fig. 4 will be described. Reference will first be made to Fig. 4 which discloses scanning and searching circuits represented by the box 32 in the system of Fig. 1. The relay 102 of Fig. 4 has three movable contact members 103, 104 and 105 each operable to an S (scan) or a T (track) position as will be pointed out in greater detail below. When the system of Fig. 1 is tracking, the plate current of the tube V9 is high enough to cause the relay 102 to operate to the T position (opposite the position shown in Fig. 4). The upper S contact is connected through the resistor 106 to the input terminal 107 of the modulator 26 while the lower S contact is connected through the resistor 109 to the input terminal 108 of the modulator 26. The middle S contact is connected to the scan limit switch arms 131 and 132. The upper T contact is connected through the resistor 110 to the lower T contact while the middle T contact is connected through the "on-target" lamp 111 and the source 112 to ground. The upper movable contact member 103 of the relay 102 is connected through the resistor 113 to the anode of the tube V11, while the lower movable contact member 105 is connected through the resistor 114 to the anode of the tube V12. The tubes V11 and V12 together constitute a snap circuit since conduction in either tube will hold the other tube cut off. The control element of the tube V11 is connected to the fixed contact member 115 while the control element of the tube V12 is connected to the fixed contact member 116. Contact members 115 and 116 are associated with a movable contact member 117 mounted on the slip clutch 128 fastened to the shaft of the motor 30. When the motor is rotating counter-clockwise, the contact member 117 quickly comes up against the contact member 116 and the clutch then slips allowing the member 116 to remain against the member 117. When the position of the motor 30 is reversed so that it is operating clockwise, for example, the movable contact member 117 is moved in the same direction as the motor is turning until it contacts the contact member 115 where it remains until the motor reverses its direction. The anode of the tube V11 is connected through the resistor 118 to the control element of the tube V12 while the anode of the tube V12 is connected through the resistor 119 to the control element of the tube V11. The control elements of the tubes V11 and V12 are connected to ground by the equal resistors 120 and 121. The cathodes are connected together and through a resistor 122 to ground. The anode of the tube V11 is also connected through the resistor 113 to condenser 123, and to the positive terminal of the source 47 through the resistor 124. Similarly, the anode of the tube V12 is connected through resistor 114 to condenser 125, similar to the condenser 123, and to the positive terminal of the source 47 through the resistor 126. The common terminal of the condensers 123 and 125 is grounded. When the movable contact finger 117, which is grounded, contacts the contact member 115, ground is placed on the control element of tube V11 and this tube is cut off, producing an unbalance voltage across the condensers 123 and 125. Similarly, when the contact member 117 comes in contact with the member 116, ground is placed on the control element of tube V12 and an unbalance voltage, in the opposite direction to that obtained before, is produced across the condensers 123 and 125.

Connected to the terminal 107 is a contact member 130 which is connected to a contact member 131 when a certain predetermined position of the variable condenser shaft in the delay unit 20 is reached. When the opposite limit is reached, contact is made between the contact member 132 and the contact member 133, which is in turn connected to the terminal 108. The contact members 131 and 132 are connected to the middle S contact of the relay 102. Also connected to the terminal 107 is the armature 140 of a relay 141, a contact 142 of which is connected to ground. Similarly, the armature 143 of relay 144 is connected to the terminal 108, contact 145 of this relay being connected to ground. One terminal of each coil of the relays 141 and 144 is connected to the positive terminal of the source 146, the negative terminal of which is connected to ground. The other terminal of the relay 141 is connected to the fixed contact 147 of the manual drive switch 148 which includes another fixed contact member 149 connected to the terminal of the coil of the relay 144 which is not connected to the source 146 and a movable hand-actuated contact member 150 which is connected to ground. The operation of the circuit shown in Fig. 4 will be described in detail below.

Figure 3:
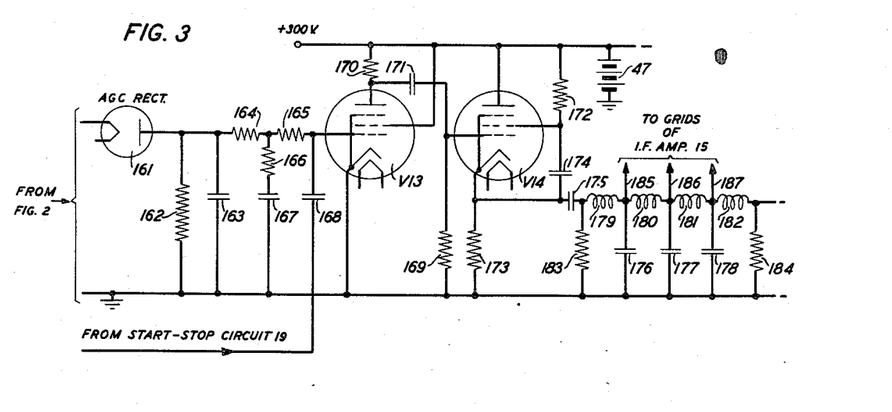
Fig. 3 is a circuit diagram of a portion of the arrangement shown in Fig. 1 utilized for automatic gain control.

The arrangement shown in Fig. 3 comprises that portion of the circuit arrangement shown in Fig. 1 represented by the boxes 33 and 34. The cathodes of the tubes V1, V2 and V3 in Fig. 2 are connected to the cathode of a diode 161 which rectifies peak negative voltage swing of these cathodes during the gate interval. The anode of the diode 161 is connected through a resistor 162 to ground. Condenser 163 is connected across the resistor 162. The members 162 and 163 together with resistors 164, 165 and 166 and condensers 167 and 168 serve as a filter for the output voltage of the rectifier 161 and also provide equalization for the gain control loop. The resistor 165 is connected to the control grid of the tube V13 to which is also applied through the coupling condenser 168, the output pulse 206 from the start-stop circuit 19 in the range unit 18. The cathode of the tube V13 is connected to ground as is also the suppressor grid. The screen grid is connected to the positive terminal of the source 47. The anode of the tube V13 is connected through the resistor 170 to the positive terminal of the source 47 and through a coupling condenser 171 to the control element of the tube V14 which serves as a cathode follower. The grid of V14 is connected to ground by means of the grid leak 169. The anode of the tube V14 is connected directly to the positive terminal of the source 47 while the screen grid is connected through the resistor 172 to this terminal of the source 47. The suppressor grid is connected to the cathode which is connected to ground through the resistor 173. A condenser 174 is connected between the cathode and the screen grid of the tube V14. The output voltage of the tube V14 is taken from the cathode through the coupling condenser 175 which is connected to a filter circuit comprising condensers 176, 177 and 178 and inductance members 179, 180, 181 and 182. The filter network is terminated by the resistances 183 and 184. Leads 185, 186 and 187 from the filter are connected to the grids or other control elements of the tubes comprising the I. F. amplifier 15. The manner in which automatic gain control signals can be utilized to vary the output of tubes being controlled in this manner is well understood so it is not deemed necessary to show the tubes comprising the I. F. amplifier 15.

Throughout the various circuits described above, cathode heaters and their circuits and "anti-sing resistors" which may be connected, if desired, in the leads to the control and screen grids of the various tubes to prevent "singing," have been omitted for the purpose of simplifying the drawing and description thereof.

Figure 6:
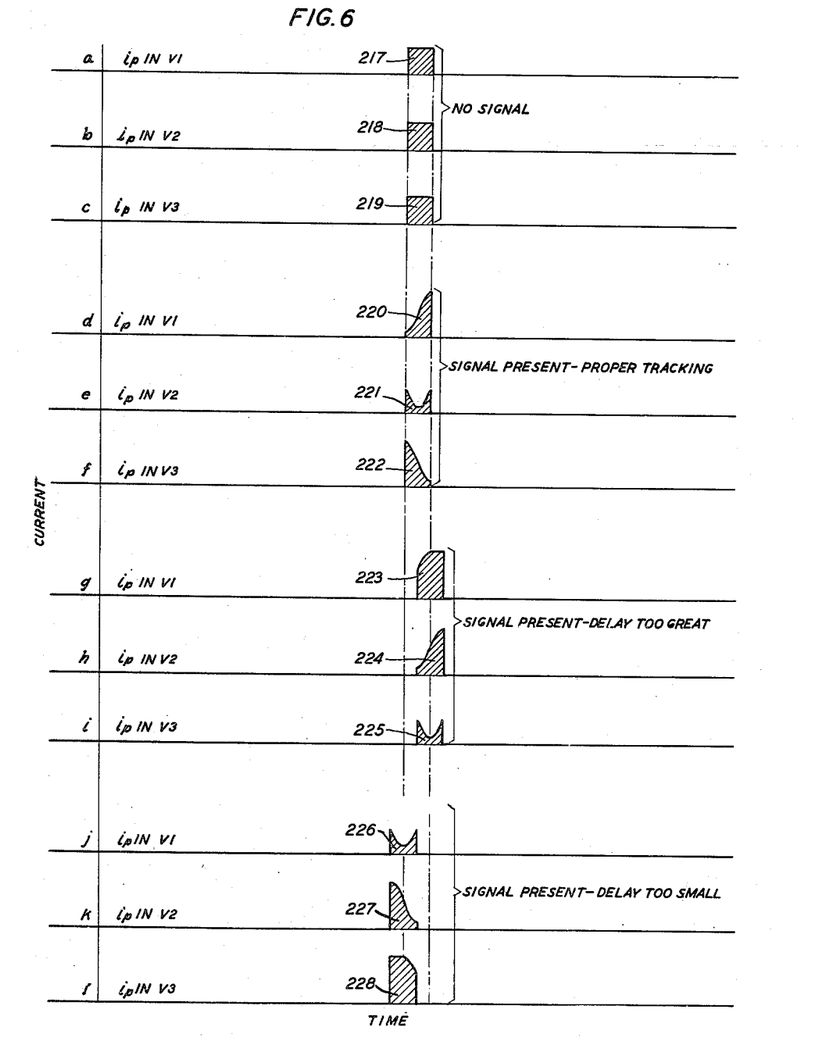

The operation of the circuits shown in Figs. 2, 3 and 4 will now be described, reference also being made to the curves shown in Figs. 5 and 6. Fig. 5, line a, shows the video output of the receiver and video amplifier 13. This output may comprise a number of echoes such as the echo 201 but for convenience of description only the echo 201 has been shown. The position of the transmitted pulse is indicated by the pulse 200, this pulse being shown in dotted lines because of the operation of the gain control circuit to cut off the I. F. amplifier during the pulsing interval. This output wave including the echo 201 is applied to the delay line 17 and three delayed images of the wave are picked off this delay line at points 1, 2 and 3. The delay between points 1 and 2 and that between points 2 and 3 is made roughly equal to $$\frac{t_g}{2}$$

The delay from the input of the line to point 1 is $t$ and in case it is desired to set $t$ equal to zero, point 1 becomes the input terminal to the line. These delayed images are shown as pulses 203, 204 and 205 in line c of Fig. 5. As pointed out above, the pulse 203 may be the echo 201 if desired, or in other words, the time $t$ between the pulses 201 and 203 can be zero. Due to the delay times of other elements of the circuit, however, it is usually best to produce a pulse 203 which is delayed from the echo pulse 201. The adjacent pulses 203, 204 and 205 are thus separated by a time interval corresponding to $$\frac{t_g}{2}$$

where $t_g$ is the time span of the pulse 209 shown in line g of Fig. 5, this pulse being the output of the gate-forming circuit 23. The three pulses 203, 204 and 205 are applied to the control grids of the tubes V1, V2 and V3, respectively, the cathodes of which are, in the absence of pulses from the gate-forming circuit 23, at a potential above their respective anodes. By way of example, the potential of each cathode may be at about 150 volts positive while that of each anode is substantially 125 volts. By means of this arrangement thermionic leakage current is eliminated. The gating pulse 209 produced by the circuit 23 is applied to the control element of the tube V4. The cathode of the tube V4 is placed at a positive potential with respect to the control grid thereof by means of the resistor 46 and the resistor 45 which serve as a voltage dividing potentiometer between the positive terminal of the source 47 and ground. Thus in the absence of a pulse from the gate-forming circuit 23 tube V4 is cut off, but upon the application of pulse 209 to the control element of this tube, a plate current pulse 210 (see Fig. 5, line h) is produced in the output circuit of the tube V4 and the corresponding negative voltage pulse is applied through the coupling condenser 50 and the respective resistors 51, 52 and 53 to the cathodes of the tubes V1, V2 and V3, respectively, to drive these cathodes suddenly in a negative direction to a few volts negative with respect to ground to produce the pulse 211 shown in Fig. 5 at line i. This makes the tubes V1, V2 and V3 conduct but the amount of current through each tube is dependent upon the position of the input pulse applied to its control element with respect to the position of the gating pulse 209. The change of the tubes V1, V2 and V3 from the non-conducting to the conducting state varies the charges on the condensers 60, 65 and 67 connected to their respective anodes. These condensers discharge through their resistors 59, 64 and 66, respectively. The time constants of these three RC circuits are, however, made long compared with the time between adjacent gating pulses which time interval, of course, is the same as between adjacent transmitted pulses. Assuming the pulses 203, 204 and 205 are symmetrically positioned with respect to the gating pulse 209, the plate currents in the tubes V1, V2 and V3, respectively, will be as shown as pulses 220, 221 and 222 at lines j, k and l, respectively of Fig. 5. For reference purposes lines j, k and l of Fig. 5 have been repeated as lines d, e and f of Fig. 6. Lines a, b and c of Fig. 6 show pulses 217, 218 and 219 of plate current produced in the tubes V1, V2 and V3 when no signal pulses are applied to the grids of these tubes, these currents being caused by the gating pulse which is so phased as to drive the cathodes of the three tubes negatively, thus making the tubes conduct. Pulses of current 223, 224 and 225 shown in lines g, h and i of Fig. 6 are present in the plate circuit of the tubes V1, V2, V3, respectively when there is an echo signal 201 present but the delay of the pulse produced by the range unit 18 is too great for symmetry while current pulses 226, 227 and 228 shown in the lines j, k and l of Fig. 6 represent the plate current pulses in the tubes V1, V2, V3, respectively, when there is an echo signal 201 present but the delay of the pulse produced by the range unit 18 is too small for symmetry. The integrated voltage outputs of the tubes V1 and V3 are applied to the differential amplifier comprising the tubes V5 and V6, an adjustment being made by the contact element 71 on the resistor 70 to produce zero output current when no input signals are applied to the control elements of the tubes V1, V2 and V3. This is called the range balance adjustment. The differential output of the tubes V5 and V6 (the "range error signal") is applied to the modulator 26 to modulate the 400-cycle carrier in the manner described above so as to actuate the motor 30 to drive the condenser in the variable R-C delay circuit 20 in such a direction as to reduce the direct current error to zero (by varying the position of the output pulse from the range unit 18 and hence the position of the gating pulse 209 with respect to the pulses 203, 204 and 205). It will be seen that the areas under the current pulses 220 and 222 are equal even though one has a reversed curvature of the upper boundary with respect to the other.

The integrated output of the tube V2 is applied to the control grid of the tube V8 which with the tube V7 comprises a differential amplifier. The average of the input voltages of the tubes V5 and V6 is obtained from the common terminal of the resistors 73 and 74 connected between the cathodes of the tubes V5 and V6 through a portion of the resistor 75 and the variable tap 76 to the control grid of the tube V7. The adjustment of the contact member 76 on the resistor 75 is made so that the control grid of the tube V7, in the absence of an echo signal, is slightly more positive than the control element of the tube V8. The connections of the tubes V7 and V8 are such that a differential output is produced which is applied to the tubes V9 and V10. The resistors 92 and 93 and condensers 94 and 95 serve as filter elements at high frequency and the resistors 96 and 97 serve with the resistors 92 and 93, respetcively, as voltage-dividing resistors to keep the high plate voltage of the tubes V7 and V8 from the control elements of the tubes V9 and V10. During tracking conditions, that is, when the pulses 203, 204 and 205 are centered with respect to the gating pulse 209, the potential of the control element of the tube V7 is more negative than that of the control element of the tube V8

$$\left(e_2 > \frac{e_1 + e_3}{2}\right)$$

and hence the control element of the tube V9 is more positive than that of the control element of the tube V10. Thus the plate current of the tube V9 is higher during tracking than that of the tube V10 and the relay 102 is actuated to the track or T position through the circuit including the terminal 100, the coil of the relay 102, the terminal 101, the connection 99, the source 47, ground, and resistor 98 to the cathode of tube V9. The plate current of the tube V10 does not flow through the relay 102 directly as the plate circuit of this tube includes the connection 99, the source 47, ground, the resistance 98 and the cathode-anode path of this tube. Inasmuch as the resistance 98, however, is in both the input and output circuits of both tubes V9 and V10, any change in the plate current of the tube V10 changes the bias of the tube V9 in such a direction that an increase in current through the tube V10 increases the bias produced by the resistance 98, or, in other words, tends to reduce the current of the tube V9. When the delay of the circuit of the range unit is too great or too small, thus producing conditions somewhat worse than that represented in lines g, h and i or in lines j, k and l in Fig. 6, $e_2$ is no longer greater than the average of $e_1 + e_3$ and the relay 102 shown in Fig. 4 returns to the S position.

When the relay 102 returns to the S position, the scanning circuit shown in Fig. 4 operates as follows: Assume that the motor 30 during tracking has been operating in the counter-clockwise direction or, in other words, the target was going in the direction of increasing range which condition is represented by the word "Out" at the left of Fig. 4. In this condition ground is applied by means of the contact elements 117 and 116 to the control element of the tube V12, causing this tube to be cut off and make its plate voltage and hence the potential of the ungrounded terminal of the condenser 125 approach 300 volts. The tube V11, however, is conducting and the ungrounded terminal of the condenser 123 is less than 300 volts and may be, for example, of the order of 150 volts. A fraction of the voltage difference between contact members 103 and 105 is applied through resistors 106 and 109 to the modulator 26 and tends to drive the motor in the same direction that it was moving during the tracking operation at a constant rate of speed. If the target is "picked up" again or, in other words, if an echo pulse is in such position with respect to the gating pulse that the gating pulse is symmetrically positioned with respect to the three delayed images of this echo pulse, tracking is reestablished and the relay 102 is operated in such a direction that the movable contact members 103, 104 and 105 contact their T contacts cutting off the anodes of tubes V11 and V12 from the modulator 26 and connecting resistor 110 across the condensers 123 and 125. If, however, a target is not "picked up," the motor 30 is driven at this constant rate of speed until the Max. scan limit switch has its elements 132, 133 forced in contact with each other, placing ground on the terminal 108 and thus reversing the relative potentials of the terminals 107 and 108 in that the terminal 108 is now negative with respect to the potential of the terminal 107 instead of being positive as in the previous condition. This causes the motor to be reversed suddenly, separating the limit switch elements 132 and 133 and moving the contact finger 117 to the fixed contact 115 instead of against the fixed contact 116. This in turn causes ground to be applied to the grid of tube V11 and causes the tube V12 to become conducting because with the cutting off of the tube V11 a positive pulse is applied to the grid of the tube V12 through the resistor 118. This causes the potential 107 to be substantially 300 volts while that of the terminal 108 is at substanstantially 150 volts or, in other words, the terminal 107 is positive with respect to the terminal 108. Thus a voltage is applied to the motor 30 to drive it at a constant rate of speed in the direction of decreasing range until a target is "picked up," thus operating relay 102 to the track position and removing the scanning voltage from the motor, or until the Min. limit switch 130, 131 has its elements contact each other, thus grounding the terminal 107 and sharply reversing the motor 30. This reversal causes the limit switch 130, 131 to have its contacts separated and the position of the finger 117 is moved from the contact member 115 to the contact member 116. In other words, in the absence of an echo signal, which may be due to fading or to the fact that no target is in position where it will be tracked, the arrangement shown in Fig. 4 will cause a scanning voltage to be applied to the motor of such magnitude and in such direction as to cause it to drive the variable condenser in the variable R-C delay circuit in the range unit 18 in such a way that the gating pulse is driven from a point corresponding to a short range to a point corresponding to a long range and then to reverse in the direction of minimum range again, this action taking place over and over until the target is picked up. If, however, a target is being tracked or, in other words, if the circuit of Fig. 2 is functioning to keep the gating pulse 209 symmetrical with respect to the pulses 203, 204 and 205, which are delayed images of a received echo, the motor can operate even past the scanning limit switches 130 and 131 or 132 and 133 as the engaging of these contacts will have no effect due to the fact that the relay 102 is in the track position and the middle S contact is thus not connected to ground. Thus the contacting of either of these scan limit switches during tracking has no effect on the potential applied to the modulator 26. During the tracking condition, the on-target lamp 111 is connected in circuit through ground and the source 112 so that it lights, thus showing the arrangement is tracking. Even though the device is tracking, the motor 30 may still be slewed off-target by connecting the movable member 150 of the manual drive switch 148 to one or the other of the fixed contact members 147 and 149, thus causing one or the other of the relays 141 or 144 to be operated, and thereby connecting one or the other of the terminals 107 or 108 to ground. When this is done, the contact member 117 establishes a scanning voltage in the same direction, causing the device to "coast" in the indicated slew direction, as soon as the on-target indication is stopped, or, in other words, as soon as the relay 102 has been shifted to the S position or until the slew has been removed, whichever is later. If a fade occurs while tracking and the on-target indication disappears, thus shifting the relay 102 to the scan position, scanning will be reestablished in the direction the target was moving, as pointed out above. The scanning speed will build up only slowly, however, as condensers 123 and 125 have been shunted by resistor 110 while tracking, and it is necessary for the charges on these condensers to build up by current drawn through resistors 113 and 114.

The negative peak voltage of the cathodes of the tubes V1, V2 and V3 is indicative of the strength of the desired echo signal. A voltage substantially equal to the average potential of these cathodes may be utilized for automatic gain control. This voltage is rectified by the rectifier 161, filtered by the resistance and condenser elements between the rectifier 161 and the tube V13, and applied as a negative voltage to the control element of the tube V13 to which is also applied the negative pulse 206 produced in the start-stop circuit 19. Tube V13, which is conducting (in the absence of the pulse from the start-stop circuit) by an amount depending on the rectified bias, is driven to cut-off by this pulse to produce a plate voltage pulse 207, the height of which depends on the voltage rectified by the diode 161 and hence on the average strength of the signal in the tubes V1, V2 and V3. If this signal is large, the height of the pulse 207 is relatively low thus applying through the cathode follower tube V14 to the grids of the tubes in the I. F. amplifier 15 a smaller positive pulse than would be the case if the signal applied to the input of the tubes V1, V2 and V3 were smaller. The grids of the I. F. amplifier are separated by 60-megacycle filter sections having more loss at all frequencies than the gain per stage to eliminate oscillations due to feedback. These filter sections are shown to the right in Fig. 3. In certain applications the inductance members might be replaced by resistance members. The grids of the tubes comprising the intermediate frequency amplifier 15 are so biased that the tubes are either cut off or passing very little current. When the pulse 207 is applied to these tubes, each becomes conducting and the gain thereof is controlled by the height of the pulse 207. It will be apparent that, because of this means for gating the intermediate frequency amplifier, a signal is passed therethrough only during the few microseconds after each transmitted pulse during which echoes are in range. The outer range limit is indicated by the dotted line at the right of Fig. 5, lines a, b and c. This protects the receiver from the transmitted pulse (some of which reaches the receiver in spite of the T—R box) and also makes "jamming" more difficult. At the same time considerable power is saved by the shortening of the duty cycle on high current tubes later in the system in that there is no noise most of the time. The absence of noise throughout the cycle stabilizes all biases and clipping levels in the integrating circuits, permitting more nearly optimum adjustment and performance. The provision of automatic gain control to hold the echo height constant permits the use of more gain when the echo is weak without paying the price of having as a result thereof a high noise level and overload during periods when the echo is strong. The gain around the servo loop (including the motor 30) is also held more nearly constant during tracking. As an alternative, a pulse derived from the range unit output pulse and appearing in the region around the selected echo 201 may be utilized to "unblank" the receiver which is thereby cut off at all times except for a short interval of time during and on each side of the selected echo. The position of this interval, of course, would vary with respect to that of the transmitted pulse in accordance with the setting of the range unit 18.

Various other modifications can obviously be made in various parts of the system disclosed above without departing from the spirit of the invention. A few of these modifications will be named but it is obvious that the naming of these few is not intended to exclude any other obvious modifications which will readily occur to one skilled in the art. In the circuit of Fig. 2 only two tubes (V1 and V3) need be used for automatic tracking, if desired. Moreover, in this circuit, the gating pulse, instead of being applied as a negative pulse to the cathodes of the tubes V1, V2 and V3, may be applied as a positive pulse to the screen grids of these tubes. More leakage will, however, take place than in the arrangement wherein "cathode-gating" is employed. Moreover, the integrated output of the gated tube V2 in Fig. 2 can be utilized directly to produce an automatic tracking indication without comparing this output with the average of the integrated outputs of the other two gated tubes (V1 and V3). Furthermore, in place of relay circuits for operating the scanning circuit of Fig. 4, vacuum tube circuits may be used instead. The operation of the cathode-gating arrangement is not limited to the use of video signals of negative polarity.

It should be noted that various novel features of the invention are not limited to use in radar systems. Various uses are being made of trains of pulses, particularly in the signal arts, and means for utilizing and controlling such pulses are therefore of rather wide application.

What is claimed is:

1. In combination, two electronic space current devices each having an input and an output circuit, means for applying similar signals, one displaced in time with respect to the other, to said input circuits respectively, means for rendering both said devices normally non-conductive means for periodically applying a gating pulse to said input circuits simultaneously to render both said devices conductive, and means common to said output circuits for utilizing the combined variations in the currents in said output circuits.

2. In combination, means for transmitting a series of separated pulses of energy to a distant point, means for receiving corresponding reflected or echo pulses from said point, means for producing a third series of pulses similar in frequency of repetition to said series of echo pulses and which coincide in time with said series of echo pulses or are displaced in time therefrom by a period which is small compared to the elapsed time between pulses, means for producing a fourth series of pulses similar to said series of echo pulses but displaced in time from said third series of pulses by a period which is small compared to the elapsed time between pulses so that each pulse in the third series is paired in time with a pulse of said fourth series, means for producing a fifth series of pulses time spaced similarly to said first-mentioned series, circuit control means upon which each pair of pulses along with a corresponding pulse of said fifth series are impressed, and means under control of said circuit control means for varying the time when the pulses of said fifth series are impressed so that they tend to be impressed symmetrically in time with respect to the pulses of corresponding ones of said pairs.

3. The combination of elements as in claim 2 in which said means for producing the third and fourth pulses are interrelated so that corresponding points in the pulses of each pair comprising a pulse of said third series and a pulse of said fourth series are separated by a time period corresponding to the duration of each pulse in said fifth series.

4. The combination of elements as in claim 2 in which said means for producing the third and fourth pulses are interrelated so that corresponding points in the pulses in each pair comprising a pulse of said third series and a pulse of said fourth series are separated by a time period corresponding to the duration of each pulse in said fifth series, each of said pulses in said fifth series being square-topped.

5. In combination, two electron discharge devices each having an anode, a cathode and a space current control element, means for maintaining each of said anodes at a negative potential with respect to its cathode in the absence of signals, pulse controlled means for suddenly and simultaneously driving said cathodes in a negative direction by an amount sufficient to make each anode positive with respect to its cathode to make the devices conducting, means for applying similar signals, one displaced in time with respect to the other, between the control elements and cathodes of said devices respectively, and means responsive to the difference between the average currents of said devices for varying the relative position of the pulse controlling said pulse controlled means and said similar signals.

6. In combination, three electron discharge devices each having an input and an output circuit, pulse controlled means for suddenly and simultaneously making the devices conducting, means for applying similar signals, the second displaced in time with respect to the first and the third displaced in time with respect to the second, to the input circuits of said devices respectively, means responsive to the difference between the average output voltages of the first and third of said devices for varying the relative position of the pulse controlling said pulse controlled means and said similar signals, and means for utilizing the average output voltage of the second of said devices to provide an indication as to said relative position.

7. The combination of elements as in claim 6 in which said last-mentioned means comprises means for comparing the average of the average output voltages of said first and third devices with the average output voltage of said second device.

8. Means for maintaining a desired phase relationship between a first and a second series of pulses spaced in time, the pulses in each series recurring substantially at the same frequency, comprising means for obtaining from the first of said series of pulses a pair of similar series of pulses, each pulse in one of said pair of series being separated from the corresponding pulse in the other of said pair of series by a fixed time period which corresponds to the duration of each pulse in the said second series, said pulses in said pair of series of pulses thereby forming a number of pairs of pulses, circuit control means upon which each of said pairs of pulses along with each corresponding pulse of the said second series of pulses is impressed, and means under control of said circuit control means for varying the times when the pulses of said second series are formed so that each tends to be impressed symmetrically in time with respect to the pulses of a corresponding one of said pairs of pulses.

9. The combination of elements as in claim 8 in which one of said pair of series of pulses is the same as or corresponds in time with said first-mentioned series of pulses.

10. The combination of elements as in claim 8 in which said two series of pulses are differently delayed images of said first series of pulses.

11. The combination of elements as in claim 8 in further combination with means for producing from said first series of pulses a fifth series of pulses, each pulse in the fifth series being intermediate a pair of adjacent pulses comprising a pulse from each series forming said pair of series of pulses, and means for utilizing the pulses in said fifth pulse to produce an indication of the relative phase position of the first series of pulses with respect to said second series.

12. In combination, means for producing a first series of pulses, means for producing a second series of pulses the spacing between adjacent pulses being substantially similar to the spacing between corresponding adjacent pulses in said first series of pulses, three electron discharge devices each in the absence of pulses applied thereto being non-conducting, means for applying the pulses in said second series to all of said devices to make them simultaneously conducting, means for producing from said first series of pulses a third, a fourth and a fifth series of pulses, the corresponding pulses in said third, fourth and fifth series being spaced apart by equal time periods, means for applying the pulses of said third, fourth and fifth series to said electron discharge devices respectively to control the current therethrough when the pulses of said first series are applied thereto, means for utilizing the output voltages of said first and third devices to shift the position of said first series of pulses with respect to said second series of pulses, and means for utilizing the output voltage of said second device to give an indication of said relative positions.

13. In an object locator system, means for transmitting a series of separated pulses of energy to a distant point, means for receiving corresponding reflected or echo pulses from said point, means for applying said received pulses to a first amplifying device, and means for rendering said amplifying device conducting independently of said received pulses for a period of time starting after the commencement of each transmitted pulse and terminating at a time thereafter which is well before the occurrence of the next transmitted pulse in the series, said rendering means including a second amplifying device being normally conducting and means for controlling the gain of said first amplifying device during the period the said first device is conducting.

14. In combination, means for generating a first series of pulses of substantially constant frequency of recurrence but in which the period of time between any two adjacent pulses therein varies from time to time, means for generating a second series of pulses of substantially the same spacing as said first series, circuit control means to which said first and second series of pulses are applied for normally maintaining a predetermined time relationship between the pulses in said second series and corresponding pulses in said first series, and means responsive to the decrease in the amplitude of the pulses of said first series below a predetermined level to cause said relationship to be varied between maximum and minimum limiting values and to reciprocate between these limiting values until pulses of said first series are reestablished above said predetermined level and corresponding pulses in said first and second series are once again in said predetermined time relationship.

15. In combination, means for producing a series of pulses of substantially constant frequency of recurrence but in which the period of time between any two adjacent pulses is varying, means for forming a second series of pulses of substantially the same spacing as said first series, circuit control means to which said first and second series of pulses are applied for normally maintaining a fixed phase relationship with respect to corresponding pulses in said first and second series, and means responsive to the decrease in the amplitude of the pulses of said first series below a predetermined level for continuously varying the time interval between adjacent pulses in said second series in the same direction that they were being varied just prior to the decrease in amplitude of said first-mentioned pulses below said predetermined level.

16. A pulse control system comprising means for transmitting from a point to a distant object a train of energy waves or pulses spaced apart in time, means at said point for receiving reflections or echoes of said pulses from said object to form a second train and for impressing them upon circuit control means, means at said point for generating a third train of pulses or waves time-spaced similarly to said first-mentioned train, means responsive to said circuit control means for normally maintaining a predetermined time relationship between corresponding pulses in said second and third trains, and means functioning when said predetermined relationship does not exist for continuously varying, first in one direction and then in the reverse direction repeatedly between predetermined maxium and minimum limits unless said relationship is reestablished during the initial variation in the reverse direction, the position of the pulses in one of said second and third trains with respect to the corresponding pulses in the other of said second and third trains until said predetermined relationship is again obtained.

17. In combination, means for simultaneously generating a first series of pulses and a second series of pulses similar in frequency of repetition to the pulses of the first series in each of which series the pulses are separated by periods which are long compared with the duration of a pulse, motor driven means for continuously variably delaying one of said series in such a manner that the time relationship between a pulse in one series and the corresponding pulse in the other series varies first in one direction and then in the reverse direction between maximum and minimum limits such that the maximum displacement in time of corresponding pulses in the two series is less than the period between those pulses and adjacent pulses of the same series, and control means upon which said delayed and undelayed series are simultaneously impressed.

18. A combination of elements as in claim 17 in further combination with means for deactivating said motor driven means when a predetermined phase relationship between pulses in said first series and corresponding pulses in said second series is reached.

19. A pulse control system comprising means for transmitting from a point to a distant object a train of energy waves or pulses spaced apart in time, means at said point for receiving reflections or echoes of said pulses from said object to form a second train and for impressing them upon circuit control means, means at said point for generating a third train of pulses or waves time-spaced similarly to said last-mentioned train, means responsive to said circuit control means for normally maintaining a predetermined time relationship between corresponding pulses in said second and third trains, and means functioning upon the failure of echoes or reflections to appear for continuously varying the position of the pulses in one of said second and third trains with respect to the corresponding pulses in the other of said second and third trains until said echoes or reflections reappear and said predetermined relationship is again obtained, said last-mentioned means being arranged so that continuous variation takes place first in one direction and then in the reverse direction repeatedly between maximum and minimum limits unless said echoes or reflections reappear and said relationship is established during the initial variation in one direction or the initial variation in the reverse direction.

20. In combination, two electronic space current devices each having an input circuit, including a cathode, and an output circuit, means for applying similar pulse signals, one displaced in time with respect to the other, to said input circuits respectively, means for rendering both said devices normally non-conductive, means for periodically applying a negative gating pulse to said cathodes simultaneously to render both said devices conductive, and means common to said output circuits for utilizing the combined variations in the currents in said output circuits.

21. In combination, repeating means including a normally non-conducting amplifying device to which is applied a series of spaced pulses and other signals between respective pulses in the series, and means for rendering said amplifying device conducting independently of said other signals for a period of time starting after the commencement of each pulse and terminating at a time thereafter which is well before the occurrence of the next pulse in the series, said rendering means including a normally conducting amplifying device and means for controlling the gain of said normally non-conducting amplifying device during the period the device is conducting.

22. In combination, repeating means including a first amplifying device to which is applied a series of spaced pulses and other signals between respective pulses in the series, and means for rendering said amplifying device conducting independently of said other signals for a period of time starting after the commencement of each pulse and terminating at a time thereafter which is well before the occurrence of the next pulse in the series, said rendering means including means for causing said device to be normally non-conducting, means for generating periodic pulses of the same frequency as said spaced pulses and each of a duration equal to the time interval it is desired to have said device conducting, means including a normally conducting amplifying device for applying said periodic pulses to said first amplifying device at such times as to render it periodically conducting for the desired period between the spaced pulses, means for deriving a variable control voltage from the amplifying device output, and means for varying the amplitude of said periodic pulses under control of said control voltage varations.

23. In a pulse control system, a first amplifying device for amplifying electrical signals which is capable of assuming the condition of being conducting or non-conducting, means for biasing said device so that it is normally in one of said conditions, means for generating periodic pulses and applying them to said first amplifying device to cause it to periodically assume the other of said conditions independently of the electrical signals to be amplified, said means including a second amplifying device which is normally conducting, means for deriving a varying control voltage from the amplifier output, and means for varying the amplitude of said periodic pulses under control of said control voltage variations.

24. An automatic range tracking pulse echo system comprising an antenna, a transmitter to generate periodic energy pulses of predetermined duration for radiation from said antenna, a receiver to receive target echoes of said pulses over said antenna, means for generating periodic voltage pulses of predetermined duration normally delayed to have their leading edges partially overlapping in time the echoes from a selected target, means for delaying target echoes by an amount to partially overlap the trailing edges of said voltage pulses, means for deriving voltages of opposing polarity from those portions of the target echoes and the delay target echoes which coincide with said voltage pulses, and means for varying the delay of succeeding such voltage pulses in accordance with the difference of said opposing voltages, whereby variations from the normal delay of the voltage pulses relative to the target echoes are reduced to and maintained at a minimum even with changes in selected target range.

25. In combination, means for transmitting a series of separated pulses of energy to a distant point, means for receiving corresponding reflected or echo pulses from said point, means for producing a third series of pulses similar in frequency of repetition to said series of echo pulses and which coincide in time with said series of echo pulses, means for producing a fourth series of pulses similar to said series of echo pulses but displaced in time from said third series of pulses by a period which is small compared to the elapsed time between pulses so that each pulse in the third series is paired in time with a pulse of said fourth series, means for producing a fifth series of pulses time spaced similarly to said first-mentioned series, circuit control means upon which each pair of pulses along with a corresponding pulse of said fifth series are impressed, and means under control of said circuit control means for varying the time when the pulses of said fifth series are impressed so that they tend to be impressed symmetrically in time with respect to the pulses of corresponding ones of said pairs.

26. In combination, a first amplifying device for amplifying electrical signals, said amplifying device being normally non-conducting, means for generating periodic pulses, means including a second amplifying device for applying said pulses to said first amplifying device to render it periodically conducting independently of the said electrical signals to be amplified, said second amplifying device being normally conducting, and means for deriving a varying control voltage from the output of said first amplifying device and for applying it to said second amplifying device for varying the amplitude of said pulses under control of said control voltage variations.

References Cited in the file of this patent

UNITED STATES PATENTS

| | | |
|---|---|---|
| 1,924,174 | Wolf | Aug. 29, 1933 |
| 2,055,662 | Mathes | Sept. 29, 1936 |
| 2,055,883 | Terry | Sept. 29, 1936 |
| 2,227,598 | Lyman et al. | Jan. 7, 1941 |
| 2,255,683 | Singer | Sept. 9, 1941 |
| 2,284,102 | Rosencrans | May 26, 1942 |
| 2,363,985 | Moser | Nov. 28, 1944 |
| 2,405,239 | Seeley | Aug. 6, 1946 |
| 2,406,019 | Labin | Aug. 20, 1946 |
| 2,433,667 | Hollingsworth | Dec. 30, 1947 |
| 2,445,584 | Ramo | July 20, 1948 |
| 2,449,985 | Gloess | Sept. 28, 1948 |
| 2,508,358 | Ayres | May 23, 1950 |